C. H. VEEDER.
FLEXIBLE SHAFT.
APPLICATION FILED NOV. 6, 1914.

1,144,624.

Patented June 29, 1915.

Attest:
W. B. McGinn
Worthington Campbell by

Inventor:
Curtis Hussey Veeder
Redding Greeley & Bordlotte
Attys.

UNITED STATES PATENT OFFICE.

CURTIS HUSSEY VEEDER, OF HARTFORD, CONNECTICUT, ASSIGNOR TO VEEDER MANUFACTURING COMPANY, OF HARTFORD, CONNECTICUT, A CORPORATION OF CONNECTICUT.

FLEXIBLE SHAFT.

1,144,624.      Specification of Letters Patent.      Patented June 29, 1915.

Application filed November 6, 1914. Serial No. 870,567.

*To all whom it may concern:*

Be it known that I, CURTIS HUSSEY VEEDER, a citizen of the United States, residing in the city of Hartford, in the State of Connecticut, have invented certain new and useful Improvements in Flexible Shafts, of which the following is a specification, reference being had to the accompanying drawings, forming a part hereof.

This invention relates to flexible shafts such as are used for the transmission of power as in the case of recording instruments, etc., and is designed particularly with reference to such shafts when inclosed in protective tubing or casing.

More particularly the invention is concerned with the provision of simple and inexpensive bearing devices for the shaft whereby its rotation within the casing is facilitated and wear on both the casing and the parts of the shaft is minimized.

Another object is to utilize such a bearing further for maintaining certain parts of the shaft in fixed relationship to other parts. In accordance with the present invention in which the shaft may be composed generally of a series of links pivotally interconnected by suitable pivot blocks, a ferrule is placed around each link at the point of pivotal connection of the link with the proximate link, so as to provide end abutments for each of the journals and prevent axial movement thereof. This ferrule has its outer surface of some spherical form for engagement with the inner face of the protective casing.

The invention will be described more particularly with reference to the accompanying drawings in which—

Figure 1:
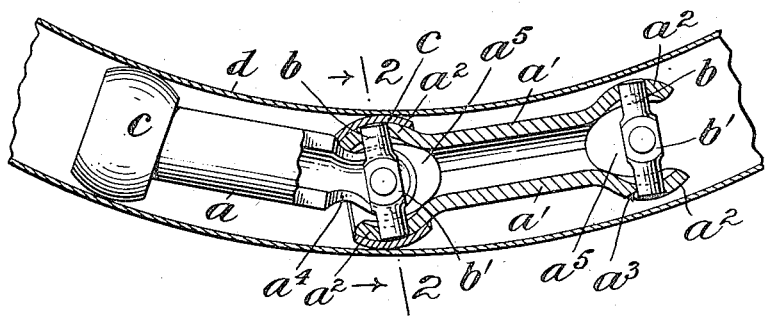
Figure 2:
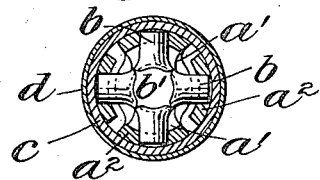
Figure 3:
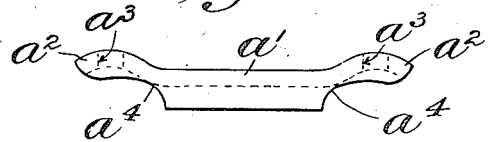
Figure 4:
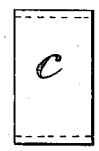
Figure 5:
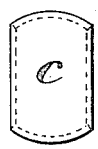

Figure 1 is a view partly in section and partly in side elevation of two links of a flexible shaft inclosed within a fragment of a protective tubing and showing particularly the disposition of the bearing in the tubing and its relationship to the pivot block. Fig. 2 is a view in section taken on the plane indicated by the line 2—2 of Fig. 1 and looking in the direction of the arrows. Fig. 3 is a view in side elevation of one of the members of the links in the illustrated embodiment of the invention. Fig. 4 is a view in elevation of the ferrule before being pressed into spherical form. Fig. 5 is a view similar to Fig. 4 but showing the ferrule as it appears when pressed into position on the links of the shaft.

It is, of course, necessary for the purposes of this description to illustrate and describe one form of flexible shaft to which the invention is applicable, but it will be understood, as this description proceeds, that the invention is not limited to any particular type of shaft or to the character of the constituent links thereof, the invention being generally applicable to all types of shaft wherein universal movement is obtained and the shaft is inclosed within a protective casing.

In Fig. 1 the shaft is illustrated as composed of a series of links $a$, each link being formed of two similar semi-cylindrical members $a'$ arranged with respect to each other so as to form a single tubular link, indicated generally by the character $a$. The ends of each of these links are preferably flared outwardly somewhat and formed of substantially semispherical outline, as indicated at $a^2$. In the semispherical portions $a^2$ are formed apertures $a^3$, opposed to each other to receive oppositely extending journals $b$, of a pivot block $b'$, the latter being of any approved form. Each semicircular link member $a'$ is also cut away adjacent its ends, as at $a^4$, to leave, with the corresponding recessed portion of the opposed member $a'$, an opening $a^5$ of such size and shape as to permit free swiveling of the next succeeding link and the journals thereof.

As each of a series of links $a$ is being assembled by placing together similar link members $a'$ or tubular links previously formed by welding such link members along their line of union and engaging therewith coöperating journals $b$ of connecting journal pivot blocks $b'$, a ferrule $c$ may be slipped on to the semispherical surfaces $a'$ of each link so as to lie over the ends of the oppositely extending journals $b$ and constitute an end abutment for each of said journals whereby axial movement thereof and bodily movement of the pivot block are prevented. When the ferrule has been so positioned it may be subjected to pressure and caused to assume a semispherical form, as indicated in Figs. 1 and 5, and engage snugly with the outer spherical surface of the proximate portions $a^2$ of the ends of the link. This engagement is such as to prevent axial movement of the ferrule and insure a secure and permanent union thereof with the link. Moreover, it results in the formation of an effective external bearing surface which, when the shaft is introduced into a protective casing $d$, engages the inner face of said casing and affords an anti-friction and anti-wear bearing surface for both the link and the casing. Of course, when a series of these ferrules $c$ are so placed within the casing $b$, the shaft proper is held entirely out of engagement with the casing and only these bearing surfaces come into contact therewith.

By the construction described it will be evident that in the illustrated embodiment, the ferrule serves three distinct purposes, to wit, it may hold the two members $a'$ of the barrel link $a$ in fixed relation to each other or assist in such holding where the members have been previously welded; it prevents axial movement of the journals $b$ and bodily movement of the pivot block $b'$; and it affords a simple, cheap and effective anti-friction and anti-wear bearing for the shaft in the protective casing, thus facilitating the rotation of the shaft and prolonging the life thereof and of the casing.

As indicated hereinbefore, while the result of the invention is the provision of an improved flexible shaft, it is to be understood that the character of the shaft to which the ferrule is applied is immaterial, so long as the difficulties referred to herein are present. Furthermore, the manner of assembling the shaft and the ferrule and the exact form of the latter may be varied so long as the advantages pointed out are realized and the construction falls within the scope of the appended claims.

I claim as my invention:

1. The combination with a flexible shaft and a protective casing therefor, of a series of rotatable bearing members fixed along the shaft in spaced relationship and rotatable with the shaft and having their outer faces of semispherical outline to bear against the inner face of the casing and rotate therein.

2. The combination with a flexible shaft composed of a series of links and a protective casing therefor, of a series of ferrules encircling the links respectively and rotatable therewith and having their outer faces of semispherical outline to bear against the inner face of the casing and rotate therein.

3. The combination with a flexible shaft composed of a series of links, pivot blocks and journals to connect said links respectively, and a protective casing for the shaft, of a series of ferrules encircling the links respectively and constituting abutments for said journals respectively to prevent axial movement thereof, said ferrules resting against the inner face of the casing and constituting bearings for the shaft.

4. A flexible shaft composed of a series of links provided with semispherical portions adjacent their ends respectively, pivot blocks and journals to connect said links respectively, said pivot blocks being disposed within said semispherical portions, and ferrules encircling the links at said semispherical portions and coöperating with the journals respectively to prevent axial movement thereof, said ferrules being pressed on to said semispherical portions so as to be in snug locking engagement therewith and present semispherical bearing surfaces to the inner wall of the casing.

5. In a flexible shaft, the combination of a casing, a series of barrel links, each composed of two similar semi-cylindrical members and provided at its ends with semispherical portions, a pivot block and journals disposed within said semispherical portions to connect pivotally adjacent links, and a series of ferrules encircling said semispherical portions respectively and coöperating with the journals to prevent axial movement thereof while pressing the semi-cylindrical members of each link together, said ferrules being pressed on to said semi-cylindrical portions and conforming thereto and presenting on their outer faces bearing surfaces for the shaft within the casing.

This specification signed and witnessed this second day of November, A. D. 1914.

CURTIS HUSSEY VEEDER.

Signed in the presence of—
KATHERINE D. KENNEDY,
E. BARRIE SMITH.